Mar. 6, 1923.
P. H. GENTZEL
1,447,944
CYLINDER OILER CONTROL FOR ENGINES
Filed Nov. 4, 1919
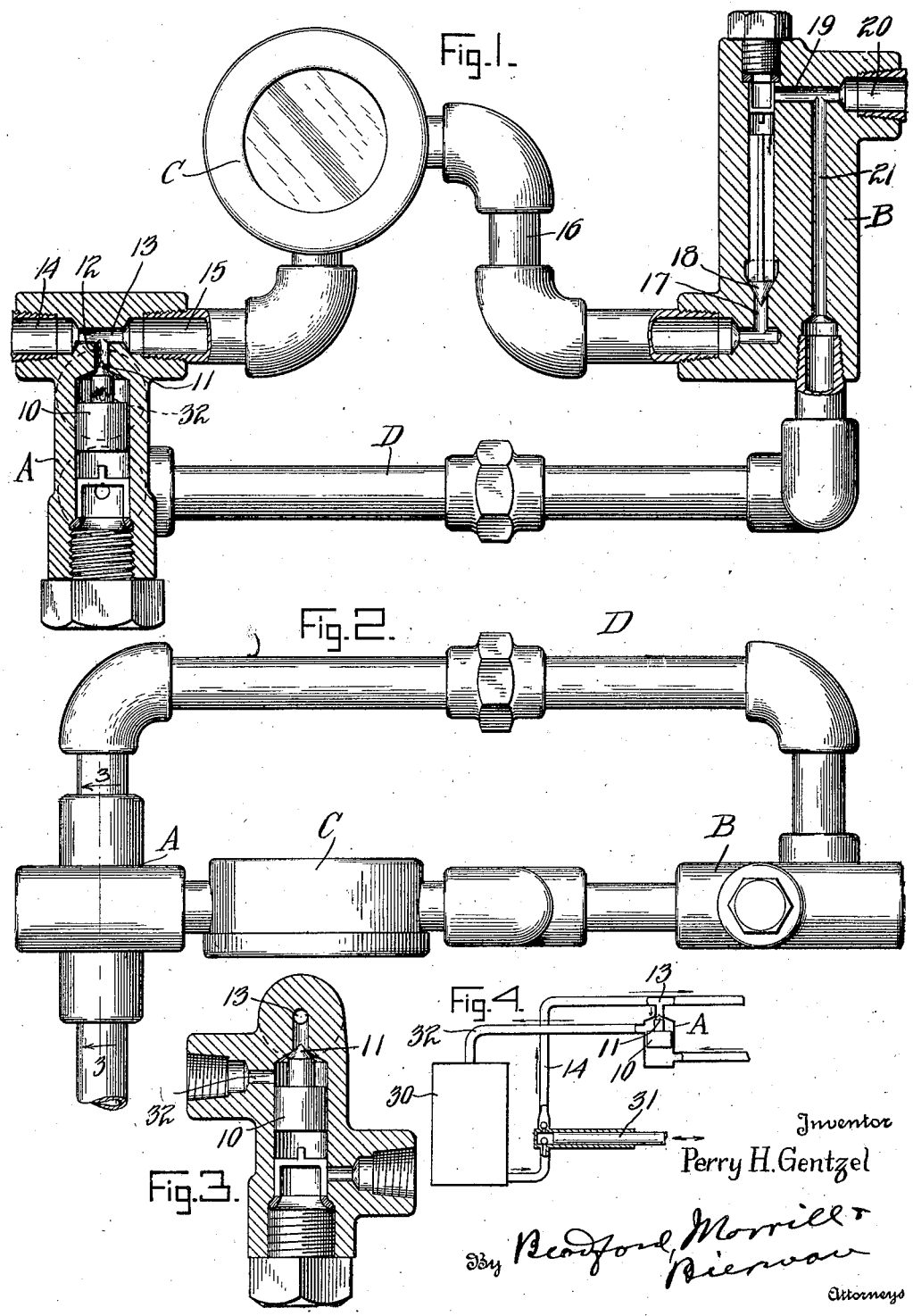
Inventor
Perry H. Gentzel
By Bedford, Morrill &
Pierrow
Attorneys Patented Mar. 6, 1923.

1,447,944

UNITED STATES PATENT OFFICE.

PERRY H. GENTZEL, OF NEWTON, MASSACHUSETTS.

CYLINDER-OILER CONTROL FOR ENGINES.

Application filed November 4, 1919. Serial No. 335,712.

*To all whom it may concern:*

Be it known that I, PERRY HOMER GENTZEL, a citizen of the United States, residing at Newton, in the county of Middlesex and State of Massachusetts, have invented certain new and useful Improvements in Cylinder-Oiler Control for Engines, of which the following is a specification.

In the operation of engines, particularly steam engines used as motors for cars, it has been found desirable to cut out the cylinder oil lubricant supply to the engine when the car is not in motion, or when the car is coasting down long grades. For the purposing of accomplishing this, I have devised an improvement in the lubricating system of engines which constitutes my present invention.

Referring to the accompanying drawings, which are made a part hereof, and on which similar reference characters indicate similar parts, Figure 1 is a view partly in elevation and partly in section illustrating the part of the lubricating system to which my invention relates, Figure 2 a plan view thereof, Figure 3 a detail section of one of the parts, and Figure 4 a diagrammatic view showing the relative position of the several parts of the apparatus.

In said drawings the portions marked A represent a valve casing; B another valve casing; C a blinker and D a pipe connecting the two casings A and B.

A plunger 10 is mounted in casing A, having a valve point 11 on its upper end adapted to seat in the lower end of vertical port 12 which leads into horizontal port 13, which normally connects pipe 14 leading from the oil supply and pipe 15 leading to the blinker C. Another pipe 16 leads from blinker C to casing B and connects to communicate with the port 17 therein. Said port 17 is controlled in one direction by a weighted check valve 18 adapted to slide vertically in the perforation. It is formed with laterally projecting wings on its vertical stem by which it is guided in said perforation while leaving passageway for the oil. Said port 17 communicates with another port 19, leading to the pipe 20 for conducting oil to the engine cylinder. Another port 21 leads from port 19 to communicate with the pipe D which is connected to casing A at a point below the underside of plunger 10.

In operation the oil is pumped from a supply tank 30 by a pump 31 (indicated diagrammatically in Figure 4) through pipe 14, pipe 15, blinker C, pipe 16, ports 17 and 19 and pipe 20 to the engine cylinder. This is the normal operation when the throttle is open. However, when the throttle is closed, check valve 18 will be seated and the pressure in pipe D relieved allowing piston 10 in the casing A to fall when the oil will by-pass through pipe 32 back to the supply tank 30.

Having thus fully described my said invention what I claim as new and desire to secure by Letters Patent, is:

1. The combination with an engine of means for cutting out the supply of oil thereto when the throttle is closed comprising a passage for feeding oil from the oil reservoir to the engine, a casing interposed in said passage, a check valve within the casing normally permitting the flow of oil through the passage, a second casing interposed in the passage at a point between the first mentioned casing and the oil reservoir and containing a piston valve normally preventing oil from entering its casing, an outlet from the piston valve casing connecting with the oil reservoir and a shunted pipe connecting the two casings whereby the piston valve is controlled by the pressure and relief as the throttle is opened and closed to allow the oil to pass to the engine or to be fed back to the oil reservoir through the said outlet, substantially as set forth.

2. The combination with an engine of means for cutting out the supply of oil thereto when the throttle is closed comprising a passage for feeding oil from the oil reservoir to the engine, two casings interposed in the passage, a valve in each casing, a shunted communication between the casings, a connection between one of the casings and the reservoir, said valves controlled by the pressure and relief as the throttle is opened and closed to allow the oil to pass from the reservoir to the engine or to be fed back to the oil reservoir through the said outlet, substantially as described.

3. In a steam engine, an oil passage leading to the cylinders, a pump to force oil through the passage, a non-return valve in the passage, a by-pass communicating with the passage between the pump and the non-return valve, a valve normally closing the by-pass and adapted to open on failure of steam pressure in the cylinders, substantially as set forth.

4. In a steam engine, an oil passage leading to the cylinders, a pump to force oil through the passage, a non-return valve in the passage, a by-pass communicating with the passage between the pump and the non-return valve, a valve adapted to close the by-pass and a steam-passage leading to the rear side of the valve whereby the valve is closed when the throttle is open and open when the throttle is closed, substantially as set forth.

In witness whereof, I have hereunto set my hand and seal at Boston, Massachusetts, this 2nd day of September, A. D. nineteen hundred and nineteen.

PERRY HOMER GENTZEL. [L. S.]

Witness:
E. W. BRADFORD.